(12) United States Patent
Ochi et al.

(10) Patent No.: US 9,933,637 B2
(45) Date of Patent: Apr. 3, 2018

(54) HEAT-DISSIPATING STRUCTURE FOR OPTICAL ISOLATOR

(71) Applicant: SHINKOSHA CO., LTD., Yokohama-shi, Kanagawa (JP)

(72) Inventors: Yuzo Ochi, Yokohama (JP); Kentaro Oguchi, Yokohama (JP); Shoji Kubomura, Yokohama (JP)

(73) Assignee: SHINKOSHA CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/501,602

(22) PCT Filed: Mar. 27, 2015

(86) PCT No.: PCT/JP2015/060533
§ 371 (c)(1),
(2) Date: Feb. 3, 2017

(87) PCT Pub. No.: WO2016/157509
PCT Pub. Date: Oct. 6, 2016

(65) Prior Publication Data
US 2017/0219850 A1    Aug. 3, 2017

(51) Int. Cl.
*H05K 7/20* (2006.01)
*G02F 1/01* (2006.01)
*G02F 1/09* (2006.01)
*F28F 13/00* (2006.01)

(52) U.S. Cl.
CPC ............ *G02F 1/0102* (2013.01); *F28F 13/00* (2013.01); *G02F 1/093* (2013.01); *F28F 2275/06* (2013.01)

(58) Field of Classification Search
USPC ......................................................... 361/688
See application file for complete search history.

(56) References Cited

U.S. PATENT DOCUMENTS 6,131,646 A * 10/2000 Kelley ..................... B64G 1/50
165/185
6,169,370 B1 * 1/2001 Platzer ..................... H05H 1/30
219/121.36
7,791,886 B2    9/2010 Ochi et al.

FOREIGN PATENT DOCUMENTS

JP     2007-065289 A    3/2007
JP        4077867 B1    4/2008
WO     2008/023450 A1   2/2008

OTHER PUBLICATIONS

PCT/ISA/210, "International Search Report for International Application No. PCT/JP2015/060533," dated Jun. 23, 2015.

* cited by examiner

*Primary Examiner* — Rodney Fuller
(74) *Attorney, Agent, or Firm* — Manabu Kanesaka

(57) ABSTRACT

The present invention includes a holding stay made of a heat conductive material that is the same as that of an isolator holder, the holding stay being in contact with a radiation stay made of a member having good thermal conductivity, the radiation stay being in contact with radiation fins extracted from the inside of the isolator holder through an external opening for extraction, columnar welded portions bond the holding stay and the isolator holder through openings for welding, the welded portions apply tensile force toward the isolator holder to the radiation stay via the holding stay, and the radiation stay presses the radiation fins by means of the above-described tensile force to be fixed to the isolator holder.

5 Claims, 11 Drawing Sheets

HEAT-DISSIPATING STRUCTURE FOR OPTICAL ISOLATOR

RELATED APPLICATIONS

The present application is National Phase of International Application No. PCT/JP2015/060533 filed Mar. 27, 2015, the disclosure of which is hereby incorporated by reference herein in its entirety.

TECHNICAL FIELD

This invention relates to a heat-dissipating structure for an optical isolator, which serves to suppress an increase in temperature.

BACKGROUND ART

The present applicant proposed a product described in Japanese Patent No. 4077867 (issued date: Apr. 23, 2008) as a heat-dissipating structure that suppresses an increase in temperature caused by light absorption in a Faraday rotator used for an optical isolator. This heat-dissipating structure includes: an isolator holder within which component elements of an optical isolator main body such as a magnetic garnet crystalline film being a magnetooptical crystalline film, a polarizer, and a magnet are arranged respectively; an external heat conducting cover member covering this isolator holder; first and second heat conductive members provided within the above-described isolator holder; and flexible radiation fins formed at a part of the second heat conductive members. The above-described isolator holder is formed in a pipe shape made of a stainless steel, or the like, and has guide openings for radiation fins, which are opened toward the above-described external heat conducting cover member, formed in an upper portion thereof. The above-described external heat conducting cover member is made of copper or the like, and has an extracting opening for radiation fins, which is opened on the side of the above-described guide openings, formed therein. The above-described first heat conductive members each have a plate shape and are provided on both sides of the above-described magnetic garnet crystalline film with the magnetic garnet crystalline film being in the middle, and the above-described second heat conductive members each also have a plate shape, are positioned opposite to the above-described magnetic garnet crystalline film across the above-described first heat conductive members, are provided adjacently to the above-described first heat conductive members, and each have a hole for a light path. The above-described radiation fins extend laterally with a gap left relative to the above-described magnet to be extracted from the above-described guide openings to the outside of the above-described external heat conducting cover member through the extracting opening and have their outer end portions in contact with the above-described outside. Further, on the occasion of practical use, a pressure plate disposed on the upper side of the above-described external heat conducting cover member and a supporting plate disposed on the lower side thereof are used to sandwich the above-described external heat conducting cover member from the upper and lower sides, and the above-described pressure plate comes in pressure contact with upper surfaces of the outer end portions of the above-described radiation fins, and at the same time, bolts are screwed into holes in four corners of this pressure plate, and thereby the above-described pressure plate secures and fixes a contact between the outer end portions of the above-described radiation fins and bottom surfaces of outer grooves of the above-described external heat conducting cover member. Further, bolts are screwed into holes in four corners of the supporting plate, and thereby the supporting plate receives bolt-screwed forces of the four corners of the above-described pressure plate on the lower side.

Heat dissipation of the optical isolator is explained, and heat produced in the above-described magnetic garnet crystalline film is directly led to the second heat conductive members through the first heat conductive members and further led to the outside of the external heat conducting cover member by the respective radiation fins. Then, the led heat is dissipated to the outside through the radiation fins, which are out of contact with the principal parts of the heat-dissipating structure other than the isolator holder and the first and second heat conductive members, and as a result, in the optical isolator, an increase in temperature is suppressed and adverse effects caused by the heat, which are deterioration of optical characteristics and the like, are suppressed.

PRIOR ART DOCUMENT

Patent Document

Patent Document 1: Japanese Patent No. 4077867

SUMMARY OF THE INVENTION

Problems to be Solved by the Invention

The conventional example makes it possible to securely dissipate the heat produced in the magnetic garnet crystalline film to the outside of the external heat conducting cover member and the pressure plate, and thus is effectively utilized broadly both domestically and internationally. The present applicant has found out points that should be further improved through long time use.

The point that should be improved first is existence of the external heat conducting cover member. This external heat conducting cover member is formed of a pair of (two) first and second external heat conducting cover portions each formed of a cap-shaped block, the first and second external heat conducting cover portions sandwiching the optical isolator main body from the right and left and holding it, and has extracting openings for radiation fins formed in upper center portions of the first and second external heat conducting cover portions. Then, the first and second external heat conducting cover portions on the right and left are coupled and fixed by two bolts being screwed thereinto. This means that the above-described external heat conducting cover member makes the heat-dissipating structure complex, resulting in that there has been room for further improvement in order to reduce the number of components and facilitate assembly.

The second is existence of the pressure plate and the support plate. The pressure plate and the supporting plate bring the outer end portions of a pair of the (two) radiation fins bent horizontally into contact with the first and second external heat conducting cover portions of the above-described external heat conducting cover member, and at the same time, for the purpose of achieving fixation and pressing of the above-described radiation fins, the above-described pressure plate is used, the support plate supports the above-described pressure plate, and further four bolts per one plate (eight bolts in total) are used. Using the above-described pressure plate and supporting plate and further using a number of bolts, together with the above-described first point that should be improved, adversely affect simplification of the heat-dissipating structure, a further reduction in the number of components, and further facilitation of assembly, resulting in that improvement has been expected.

An object of this invention is to simplify a configuration, reduce the number of components, and facilitate manufacture and assembly.

Means for Solving the Problems

A heat-dissipating structure for an optical isolator according to this invention includes: a cylindrical isolator holder that has a plurality of components configuring an optical isolator main body disposed thereinside and has an opening for extraction reaching the inside formed in an outer portion thereof; extracting members for radiation that are extracted from the inside of the isolator holder through the opening for extraction in the outer portion; a radiation stay that is made of a member having good thermal conductivity, is disposed on an outer side of the isolator holder to surround the isolator holder, and includes an abutting plate portion in contact with the extracting members for radiation; a holding stay in contact with the abutting plate portion of the radiation stay; and welded portions bonding the holding stay and the isolator holder through openings for welding. The abutting plate portion is positioned between the isolator holder and the holding stay, and the openings for welding are opened in the abutting plate portion in a passing-through state from a side of the holding stay toward a side of the isolator holder. The welded portions apply tensile force that draws the holding stay and the isolator holder, and the abutting plate portion presses the extracting members for radiation via the tensile force.

In order to increase a heat-dissipating effect, a radiation sheet that is made of a member having good thermal conductivity may be used, the radiation sheet may be disposed between the abutting plate portion and the outer portion of the isolator holder, and at the same time, sandwich the extracting members for radiation together with the abutting plate portion.

The radiation stay may be configured by side plate portions that cover both sides of the isolator holder; and a coupled abutting plate portion being the abutting plate portion that covers an outer portion side of the isolator holder and is coupled between the both side plate portions, the holding stay may have thick portions for welding formed thereon, the thick portions of the holding stay may be fitted into the openings for welding, and the welded portions may bond the holding stay and the isolator holder through the thick portions.

A bottomed position holding hollow may be provided in the coupled abutting plate portion, the holding stay may be enabled to be fitted in the position holding hollow, and the openings for welding may be opened in a bottom portion of the position holding hollow.

A gap that enables welding may be made between the thick portions of the holding stay and the outer portion of the isolator holder, to enable secure welding.

BEST MODE FOR CARRYING OUT THE INVENTION

Hereinafter, there will be explained one embodiment in a heat-dissipating structure for an optical isolator according to the present invention based on FIG. 1 to FIG. 11.

Figure 1:
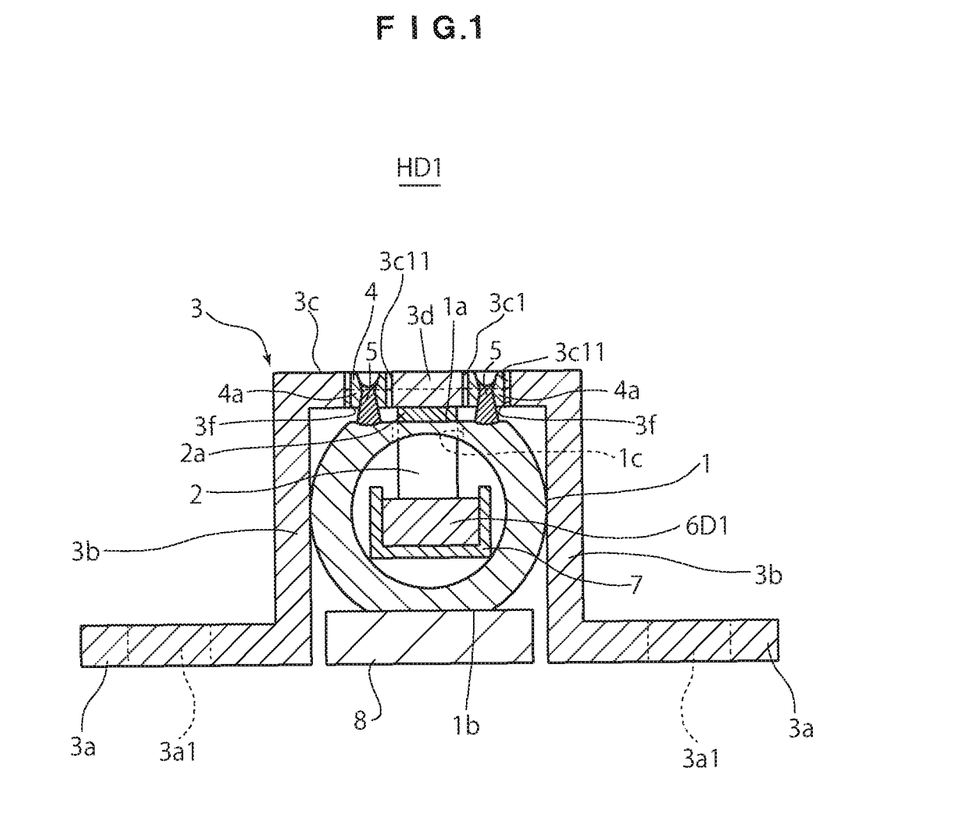
FIG. 1 is a cross-sectional view illustrating one embodiment in a heat-dissipating structure for an optical isolator according to this invention.
Figure 2:
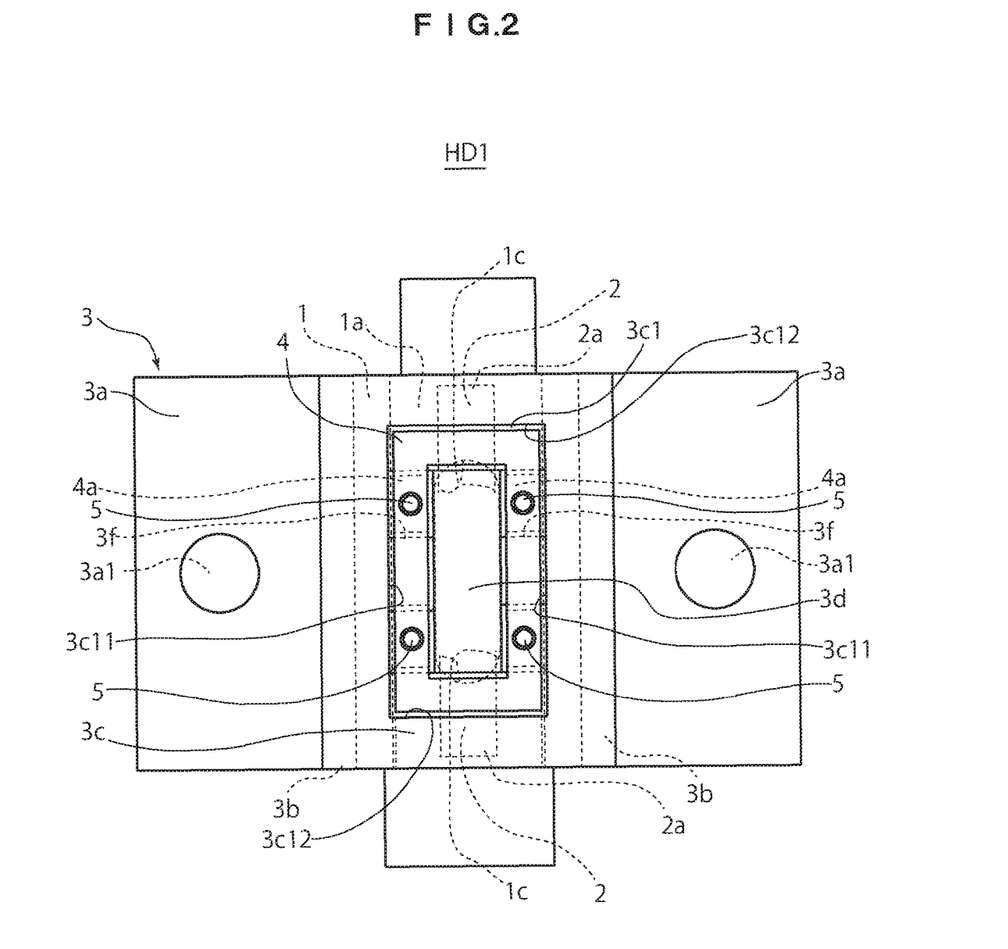
FIG. 2 is a plan view illustrating the embodiment in the heat-dissipating structure for an optical isolator according to this invention.

A heat-dissipating structure for an optical isolator HD1 illustrated in FIG. 1 and FIG. 2 includes: an isolator holder 1; radiation fins 2 being extracting members for radiation; a radiation stay 3; a holding stay 4; and welded portions 5.

Main roles of components in the above-described heat-dissipating structure for an optical isolator are summarized, and then, the radiation fins 2 and the radiation stay 3 perform a heat-dissipating function, and the isolator holder 1, the holding stay 4, and the welded portions 5 work in cooperation for coupling the above-described radiation fins and radiation stay and holding and fixing them to perform the function.

Figure 3:
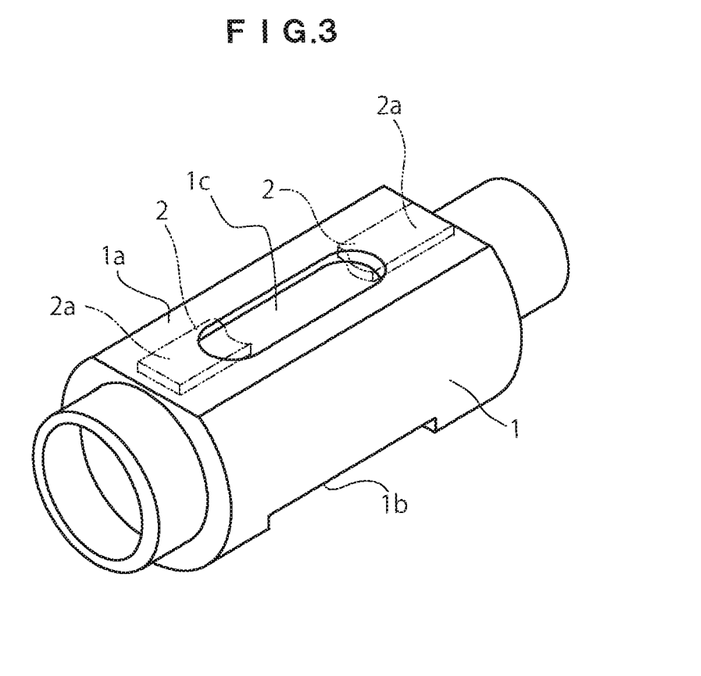
FIG. 3 is a perspective view illustrating an isolator holder to be used in the heat-dissipating structure for an optical isolator according to this invention.
Figure 4:
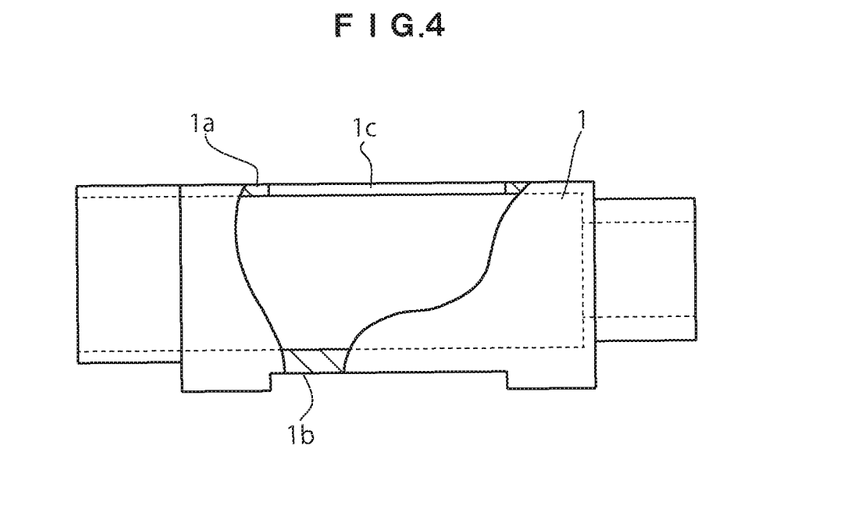
FIG. 4 is a side view illustrating the isolator holder to be used in the heat-dissipating structure for an optical isolator according to this invention, and is a view where a part of its main body is cut out.
Figure 5:
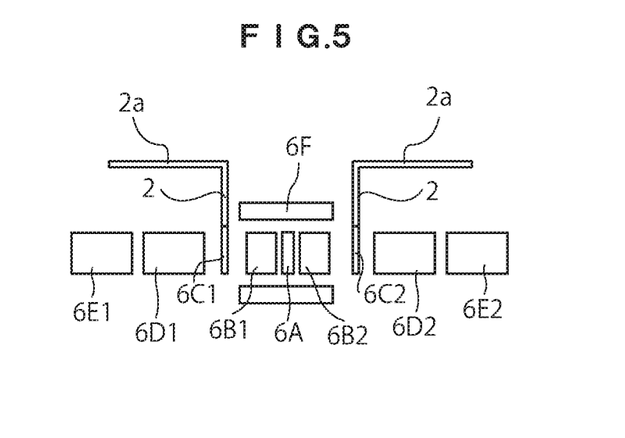
FIG. 5 is a configuration diagram for explaining an outline of a combination of components configuring a main part of an optical isolator main body in the heat-dissipating structure for an optical isolator according to this invention.

The isolator holder 1 illustrated in FIG. 1 to FIG. 4 is formed in a circular or square cylindrical shape made of a stainless steel material or the like, and in an example of FIG. 3, the isolator holder 1 is formed in a circular pipe shape made of a stainless steel material. As illustrated in FIG. 3 and FIG. 4, the isolator holder 1 has a flat upper surface 1a obtained by cutting out an upper portion thereof toward an axial center direction of a main body portion, and has a flat base surface 1b obtained by cutting a bottom portion of a lower portion thereof to be flat. The flat base surface 1b has a role as a reference surface that controls a rotation direction of the isolator holder 1. In the flat upper surface 1a, which is an outer portion of the isolator holder 1, an opening for extraction 1c having a long hole shape, which reaches an inside of the isolator holder, is formed. As illustrated in FIG. 5, inside the isolator holder 1, a plurality of components 6A, 6B1, 6B2, 6C1, 6C2, 6D1, 6D2, 6E1, 6E2, and 6F that configure an optical isolator main body are disposed. In an example illustrated in FIG. 5, as the component 6A, a magnetic garnet crystalline film being a magnetooptical crystalline film is used, as the components 6B1, 6B2, 6C1, and 6C2, first and second heat conductive plates are used, as the components 6D1, 6D2, 6E1, and 6E2, first and second doubly refracting crystal plates being polarizers are used, and as the component 6F, a magnet is used. Among these components 6A, 6B1, 6B2, 6C1, 6C2, 6D1, 6D2, 6E1, 6E2, and 6F, the above-described respective components other than the magnet 6F are disposed linearly along a light path of a forward beam, and all the components including the magnet are held in a component holding case 7 (FIG. 1) housed in the isolator holder 1. The component holding case 7 is formed in a groove shape in section with an upper end thereof opened.

In FIG. 5, the first heat conductive plates 6B1 and 6B2 are disposed across the magnetic garnet crystalline film 6A in a sandwich state. The first heat conductive plates 6B1 and 6B2 are attached to outer surfaces of the magnetic garnet crystalline film 6A individually by a means of optical adhesive bonding, pressure bonding, or the like. Then, the second heat conductive plates 6C1 and 6C2 each have a hole (not illustrated) opened in a center portion thereof so as to be positioned for a light path being a beam path, and have the paired radiation fins 2 extending upward therefrom. For the first and second heat conductive plates 6B1, 6B2, 6C1, and 6C2, a heat conductive material such as a copper material is used.

The magnetic garnet crystalline film 6A and the first heat conductive plates 6B1 and 6B2 are disposed in the cylindrical magnet 6F, and the magnetic garnet crystalline film 6A is a Faraday element.

The radiation fins 2 are explained, and the radiation fins are paired, and at the same time, are formed integrally with the second heat conductive plates 6C1 and 6C2 respectively as one parts of the second heat conductive plates 6C1 and 6C2, and are bendable. The material of the respective radiation fins 2 is a copper material in the illustrated example, and thus the radiation fins 2 have high thermal conductivity, and are processed easily and bendable into an arbitrary shape, and can maintain a deformed shape. The respective radiation fins 2, as illustrated in FIG. 5, extend upward so as to gradually go away from positions apart from side surfaces of the magnet in a lateral direction of the magnet 6F, and without coming into contact with an inner peripheral surface of the magnet, outer end portions 2a thereof are extended outward in directions opposite to each other with a gap left relative to the magnet to be bent. The outer end portions 2a of the bent radiation fins 2 are each in contact with the flat upper surface 1a of the isolator holder 1.

The radiation stay 3 is explained with reference to FIG. 1, FIG. 2, FIG. 6, and FIG. 7.

Figure 6:
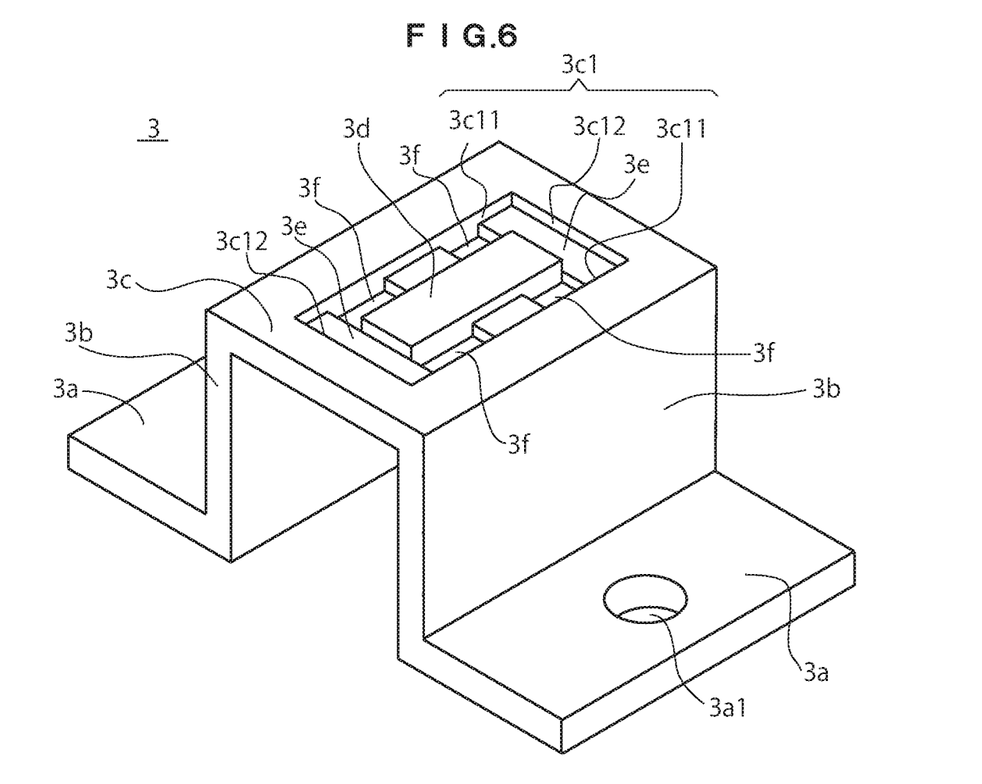
FIG. 6 is a perspective view illustrating a radiation stay to be used in the heat-dissipating structure for an optical isolator according to this invention.

The radiation stay 3 is made of a member having good thermal conductivity made of a copper material, a carbon material, or the like. The radiation stay 3 is disposed on the outer side of the isolator holder 1 so as to surround the isolator holder. The radiation stay 3 is formed in a bridge shape (specifically a hat shape) in an example of FIG. 6. As illustrated in FIG. 1 and FIG. 6, the radiation stay 3 includes: side plate portions 3b rising from seat plate portions 3a each having a mounting hole 3a1 therein, the side plate portions 3b disposed on both sides of the isolator holder 1; and a coupled abutting plate portion 3c, which is an abutting plate portion, coupled between the both plates. In other words, the radiation stay 3 surrounds (covers) the outer side of the main body part of the isolator holder 1 excluding the bottom portion with the both side plate portions 3b and the coupled abutting plate portion 3c.

Figure 7:
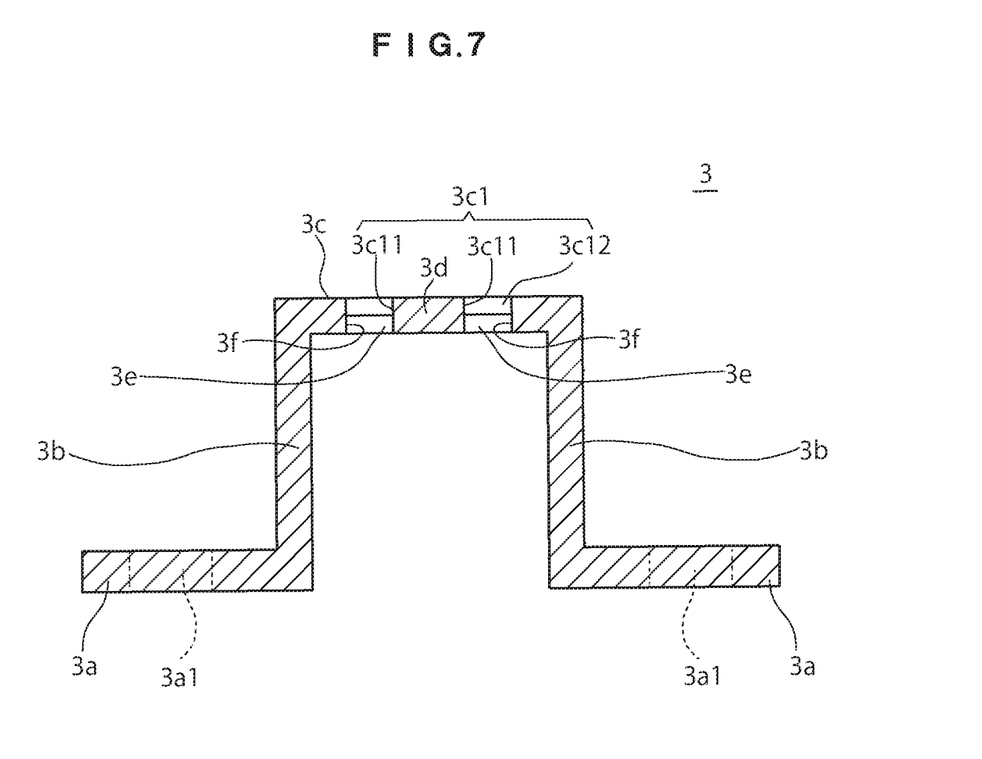
FIG. 7 is a cross-sectional view illustrating the radiation stay to be used in the heat-dissipating structure for an optical isolator according to this invention.

A lower surface of the coupled abutting plate portion 3c abuts on the radiation fins 2. As illustrated in FIG. 6 and FIG. 7, in the coupled abutting plate portion 3c, a position holding hollow 3c1 with a bottom plate portion 3e being a bottom is formed. The position holding hollow 3c1 is configured by two-row slits 3c11 across a partition 3d and coupling grooves 3c12 each coupling both end portions of the both slits. In the position holding hollow 3c1, the two-row slits 3c11 corresponding to a long side and the coupling grooves 3c12 corresponding to a short side are formed in a "rectangular" shape as a whole. The two-row slits 3c11 are partitioned into right and left by the partition 3d in the middle (see FIG. 7). At positions, of the bottom plate portion 3e, corresponding to the respective slits 3c11, openings for welding 3f passing through the bottom plate portion in a thickness direction are opened, and in FIG. 6, four places are opened on the left, right, upper and lower sides. The respective openings for welding 3f in the coupled abutting plate portion 3c are provided for the purpose of enabling the isolator holder 1 and the holding stay 4 to be securely bonded by an appropriate welding means as will be described later.

The holding stay 4 is explained with reference to FIG. 1, FIG. 2, FIG. 8, and FIG. 9.

Figure 8:
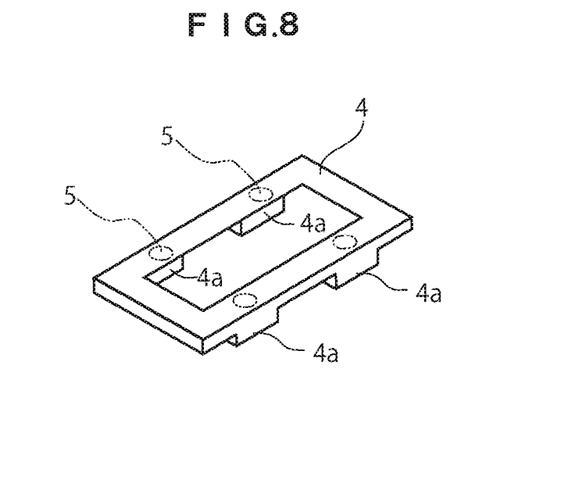
FIG. 8 is a perspective view illustrating a holding stay to be used in the heat-dissipating structure for an optical isolator according to this invention.

The holding stay 4 is formed in a plate shape made of a stainless steel material or the like, and in an example of FIG. 8, the holding stay 4 is formed in a "rectangular" shape made of a stainless steel material. On a lower surface side of the holding stay 4, block-shaped thick portions 4a for welding are projectingly provided, and in the example of FIG. 8, they are provided at four places.

There are explained relations between the two and the three of the isolator holder 1, the radiation stay 3, and the holding stay 4 with reference to FIG. 1, FIG. 2, FIG. 9, and FIG. 10.

Figure 10:
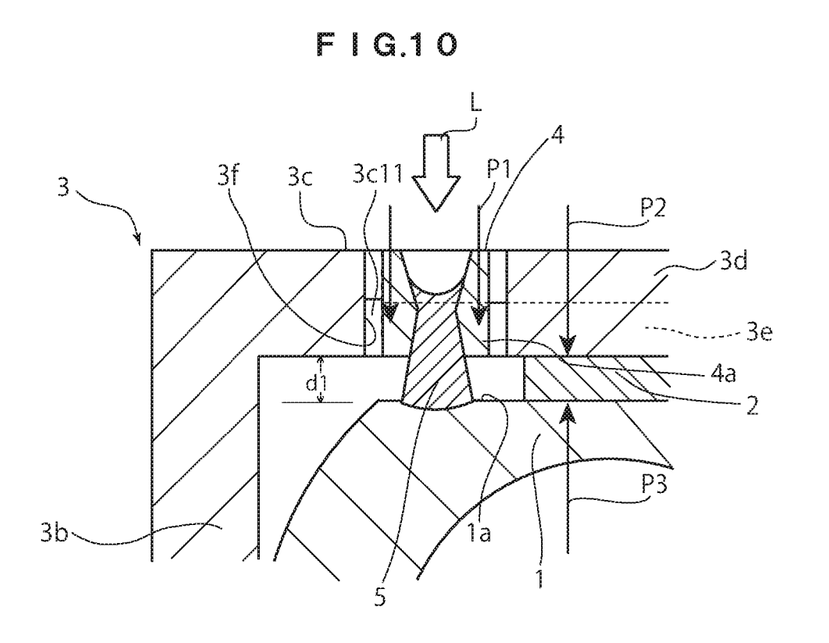
FIG. 10 is an enlarged cross-sectional view for explaining a state where the holding stay used in the heat-dissipating structure for an optical isolator according to this invention presses and fixes a radiation fin.

In terms of the relation between the radiation stay 3 and the holding stay 4, the holding stay is disposed on the coupled abutting plate portion 3c of the radiation stay in a contact state. Specifically, as illustrated in FIG. 1 and FIG. 10, the holding stay 4 is fitted in the position holding hollow 3c1, namely in the slits 3c11 and the coupling grooves 3c12 of the coupled abutting plate portion 3c. The thick portions 4a of the holding stay 4 are fitted into the openings for welding 3f opened in the bottom portion at the slits 3c11, and their positions are held.

Then, in terms of the relation between the isolator holder 1 and the holding stay 4, the holding stay is disposed over the flat upper surface 1a of the isolator holder, and between the thick portions 4a and the flat upper surface, a gap d1 for welding is made (see FIG. 10). The thick portions 4a help the gap d1 for welding be maintained.

Further, in terms of the relation between the isolator holder 1, the radiation stay 3, and the holding stay 4, the holding stay is bonded to the upper portion of the isolator holder 1 by the later-described columnar welded portions 5 passing through the openings for welding 3f and the gap d1 for welding. In a process where the welded portion 5 melted by laser welding solidifies, the isolator holder 1 and the holding stay 4 are drawn in an arrow P3 direction and in an arrow P2 direction in FIG. 10. Therefore, the radiation stay 3 presses the radiation fins 2 from above via the holding stay 4, and is fixed to the flat upper surface 1a of the isolator holder 1. As a result, the radiation stay 3 (bottom plate portion 3e) and the holding stay 4 are stacked on the flat upper surface 1a of the isolator holder 1 with the radiation fins 2 interposed therebetween, so that thermal conductivity from the above-described radiation fins to the above-described radiation stay is achieved securely.

The welded portions 5 are explained with reference to FIG. 1, FIG. 2, and FIG. 10.

The welded portions 5 each have a columnar shape. As illustrated in FIG. 10, the thick portion 4a of the holding stay 4 is fitted into the opening for welding 3f, and for example, a YAG laser L is irradiated to a lower surface of the thick portion through an upper surface of the holding stay, and then the upper surface of the holding stay is melted gradually and the welded portion 5 is gradually formed with a molten metal falling in an arrow P1 direction in FIG. 10. When the welded portion 5 reaches the flat upper surface 1a of the isolator holder 1 through the thick portion 4a of the holding stay, an upper end surface of the welded portion on the above-described holding stay side is formed in a concave shape that is curved downward in FIG. 10. Therefore, a lower end surface of the welded portion 5 melts also one portion of the flat upper surface 1a of the isolator holder 1 and is formed in a convex shape that is curved downward in FIG. 10. Consequently, the columnar welded portion 5 bonds the holding stay 4 and the upper portion of the isolator holder 1.

It is not necessary to provide the thick portions 4a on the holding stay 4, but by providing the thick portions, the gap d1 for better welding can be secured, and by adjusting the thickness of the thick portions, a distance for welding (the gap d1) can be set to an optimal one.

A method of assembling the heat-dissipating structure for an optical isolator HD1 is explained with reference to FIG. 1, and FIG. 9 to FIG. 11 mainly.

Figure 11:
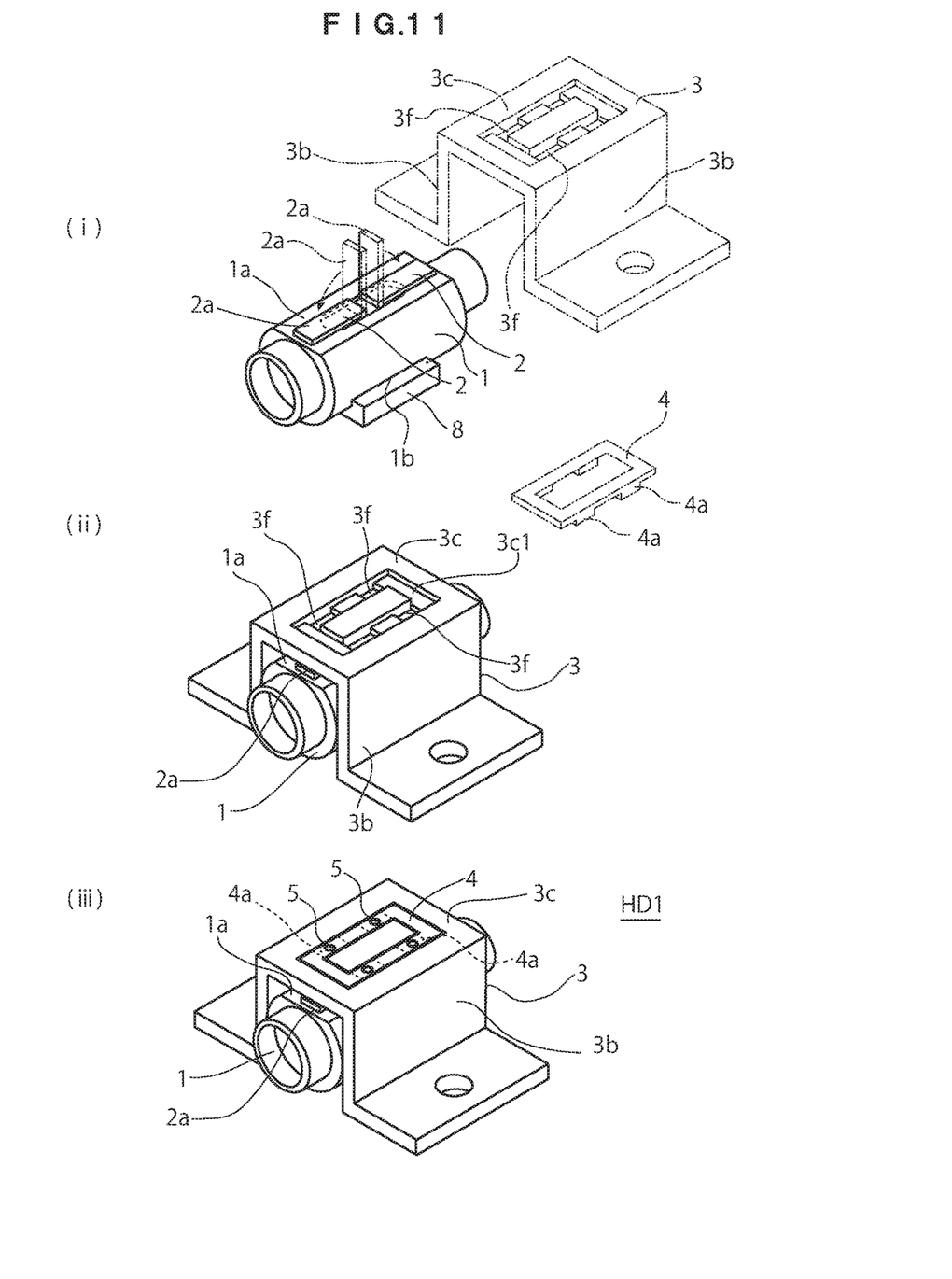
FIG. 11 is a reduced perspective view illustrating an assembling process of the heat-dissipating structure for an optical isolator according to this invention in stages, where (i) illustrates a process of mounting the isolator holder on a reference stage and fixing a reference position of the isolator holder, (ii) illustrates a process of pressing outer end portion sides of the radiation fins exposed from the isolator holder by the radiation stay, and (iii) is a view illustrating a state where the assembling process is completed.

Beforehand, the isolator holder 1, the radiation stay 3, and the holding stay 4 illustrated in (i) and (ii) of FIG. 11 are placed on an assembly table (not illustrated).

Then, as illustrated in (i) of FIG. 11, the isolator holder 1 with the flat base surface 1b positioned below is first mounted on an upper surface of the reference stage 8, and the reference stage thereby controls the rotation direction of the isolator holder and achieves position stabilization, and at the same time, fixes a reference position. The above-described isolator holder with the flat base surface 1b positioned below is mounted on the upper surface of the reference stage 8 so that the uniform gap d1 for welding (FIG. 10) can be maintained between the lower end surfaces of the thick portions 4a for welding of the holding stay 4 and the flat upper surface 1a of the isolator holder when the isolator holder 1 is seen from the side.

Then, as indicated by chain lines in (i) of FIG. 11, the outer end portion 2a sides of the radiation fins 2 are extracted from the inside of the isolator holder 1 and the outer end portion 2a sides are folded onto the flat upper surface 1a of the above-described isolator holder.

The outer end portion 2a sides of the radiation fins 2 are folded, and then as illustrated in (ii) of FIG. 11, the radiation stay 3 is lowered from directly above the isolator holder 1 and the radiation stay is put on the outer end portion 2a sides. At the stage where the radiation stay 3 is put over the isolator holder 1, the lower surface of the coupled abutting plate portion 3c of the radiation stay 3 comes in contact with upper surfaces of the outer end portion 2a sides of the radiation fins 2, and then the above-described lower surface and the flat upper surface 1a of the isolator holder 1 sandwich the outer end portion sides therebetween.

Figure 9:
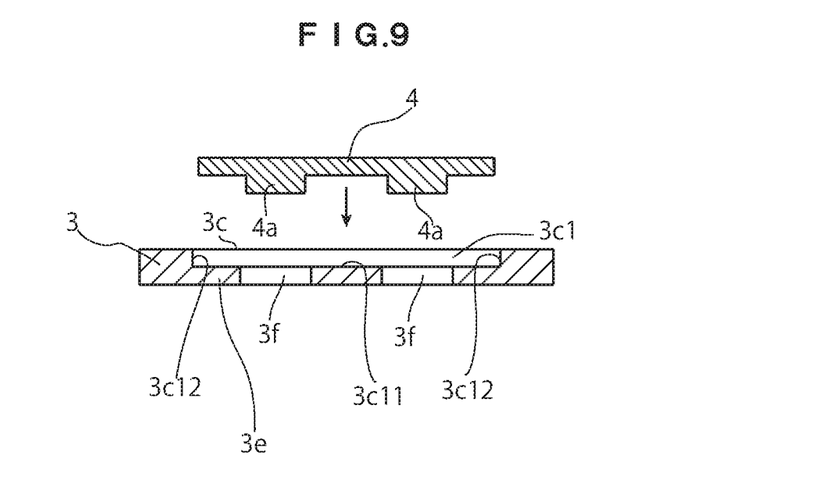
FIG. 9 is an enlarged cross-sectional view illustrating a correspondence relation between thick portions of the holding stay and openings for welding of the radiation stay that are used in the heat-dissipating structure for an optical isolator according to this invention.

Thereafter, as illustrated in FIG. 9 and (iii) of FIG. 11, in a state where the thick portions 4a for welding of the holding stay 4 face the openings for welding 3f of the radiation stay, the holding stay 4 is fitted in the position holding hollow 3c1 of the radiation stay. At this time, the thick portions 4a of the holding stay 4 are fitted into the openings for welding 3f of the radiation stay 3. Then, laser welding is performed from an arrow L direction in FIG. 10. That is, YAG laser welding is performed from each circular position indicated by a chain line in FIG. 8 on the upper surface of the thick portion 4a of the holding stay 4 toward the rear side (lower side in FIG. 10). By the welding, the thick portion 4a of the holding stay 4 melts and a molten metal reaches the flat upper surface 1a of the isolator holder 1 through the opening for welding 3f. Further, one portion of the isolator holder 1 also melts, and then such a columnar welded portion 5 as illustrated in FIG. 10 is formed finally. In a process where the welded portion 5 solidifies, the flat upper surface 1a of the isolator holder 1 and the holding stay 4 are drawn in the arrow P3 direction and in the arrow P2 direction, and then the radiation stay 3 is pressed on and fixed to the isolator holder 1 tightly.

In the optical isolator main body, as illustrated in FIG. 5, from the left side in FIG. 5, the forward beam, which is an incident light, passes through the second and first doubly refracting crystal plates 6E1 and 6D1, and then passes through the second heat conductive plate 6C1, the first heat conductive plate 6B1, the magnetic garnet crystalline film 6A, the first heat conductive plate 6B2, the second heat conductive plate 6C2, and the first and second doubly refracting crystal plates 6D2 and 6E2. The magnetic garnet crystalline film 6A absorbs the light passing therethrough, to thereby produce heat. The produced heat is dissipated to the first and second heat conductive plates 6B1, 6B2, 6C1, and 6C2, and further the heat is led to the outside of the isolator holder 1 via the outer end portion 2a sides of the radiation fins 2, and furthermore, the radiation fins each exhibit a function as a cooling component, resulting in that efficient heat dissipation is enabled.

As a result, in the optical isolator, an increase in temperature is suppressed and effects by the heat, which are deterioration of optical characteristics and the like, are suppressed. In a heat conducting path from the magnetic garnet crystalline film 6A, which is a heating source, to the flat upper surface 1a of the isolator holder 1, members other than the first heat conductive plates 6B1 and 6B2 and the second heat conductive plates 6C1 and 6C2 do not exist, and thus the heat conducting path is made short and is simplified, resulting in high thermal responsiveness.

According to the embodiment of the heat-dissipating structure for an optical isolator HD1 of this invention, the means by means of bolt screws is prevented and such an external heat conducting cover member as the conventional example is omitted, thereby making it possible to reduce the number of components and assembly. Then, since on the holding stay 4, the thick portions 4a for welding to fit into the openings for welding 3f are provided, the radiation stay 3 and furthermore the radiation fins 2 are tightly fixed to the isolator holder 1 by means of tensile force applied by the welded portions 5. Further, the bottomed position holding hollow 3c1 is provided in the coupled abutting plate portion 3c, the holding stay 4 is fitted in the position holding hollow, the openings for welding 3f are opened in the bottom portion of the above-described position holding hollow, and the thick portions 4a are enabled to be fitted into the above-described openings for welding, and thereby the position holding by the holding stay 4 is simplified to make welding secure. Since the gap d1 enabling welding is made between the thick portions 4a of the holding stay 4 and the outer portion of the isolator holder 1, which is the flat upper surface 1a in an example of FIG. 1, high drawing force is obtained during welding. The outer portion of the isolator holder 1 is not necessarily required to be flat.

There will be explained another embodiment in the heat-dissipating structure for an optical isolator according to the present invention based on FIG. 12 to FIG. 15.

Figure 12:
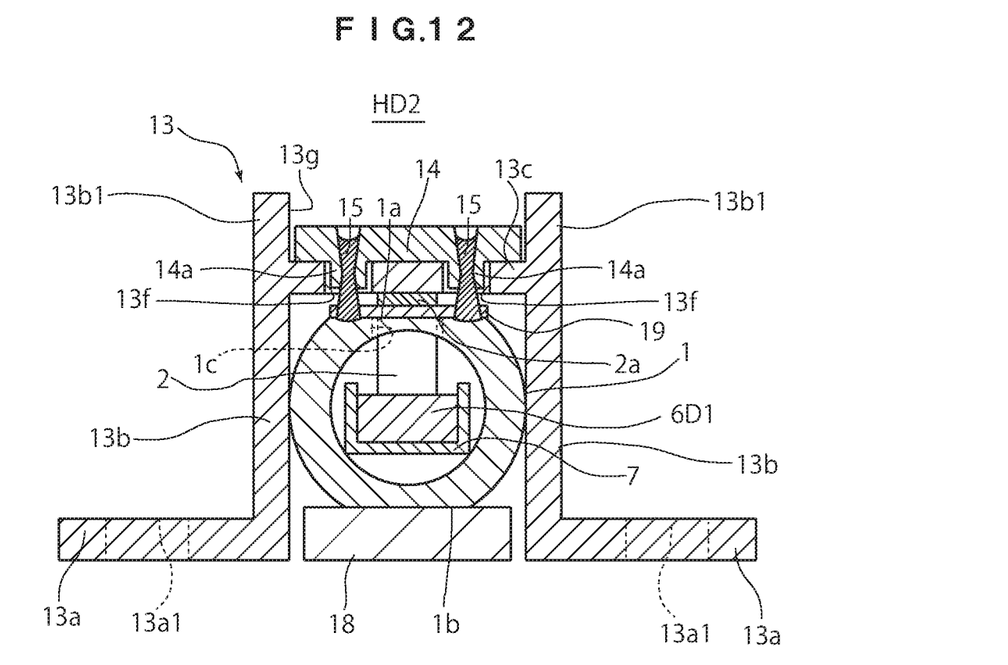
FIG. 12 is a cross-sectional view illustrating another embodiment in the heat-dissipating structure for an optical isolator according to this invention.
Figure 13:
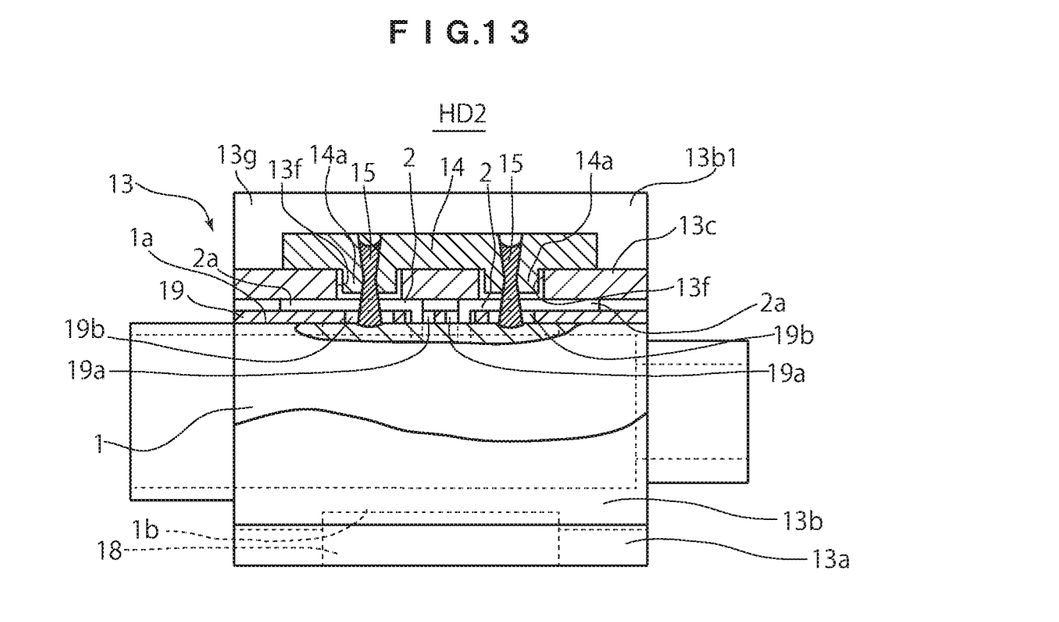
FIG. 13 is a side view illustrating a cross section of the partially cut-out embodiment in the heat-dissipating structure for an optical isolator according to this invention.

A basic configuration and operation and effect of a heat-dissipating structure for an optical isolator HD2 illustrated in FIG. 12 and FIG. 13 are common to those of the heat-dissipating structure for an optical isolator HD1 illustrated in FIG. 1 and FIG. 2. Therefore, differences (features) of the heat-dissipating structure for an optical isolator HD2 from the heat-dissipating structure for an optical isolator HD1 are mainly explained. Common points are explained when necessary, and detailed explanations thereof are omitted.

Incidentally, also in the heat-dissipating structure for an optical isolator HD2, the isolator holder 1, the radiation fins 2, the plural components configuring the optical isolator main body, (where only the component 6D1 is illustrated in FIG. 12), and the component holding case 7, which are used in the heat-dissipating structure for an optical isolator HD1, are used as they are.

The main feature of the heat-dissipating structure for an optical isolator HD2 is to add a radiation sheet 19 for the purpose of further increasing the heat-dissipating effect as compared to the heat-dissipating structure HD1.

Figure 14:
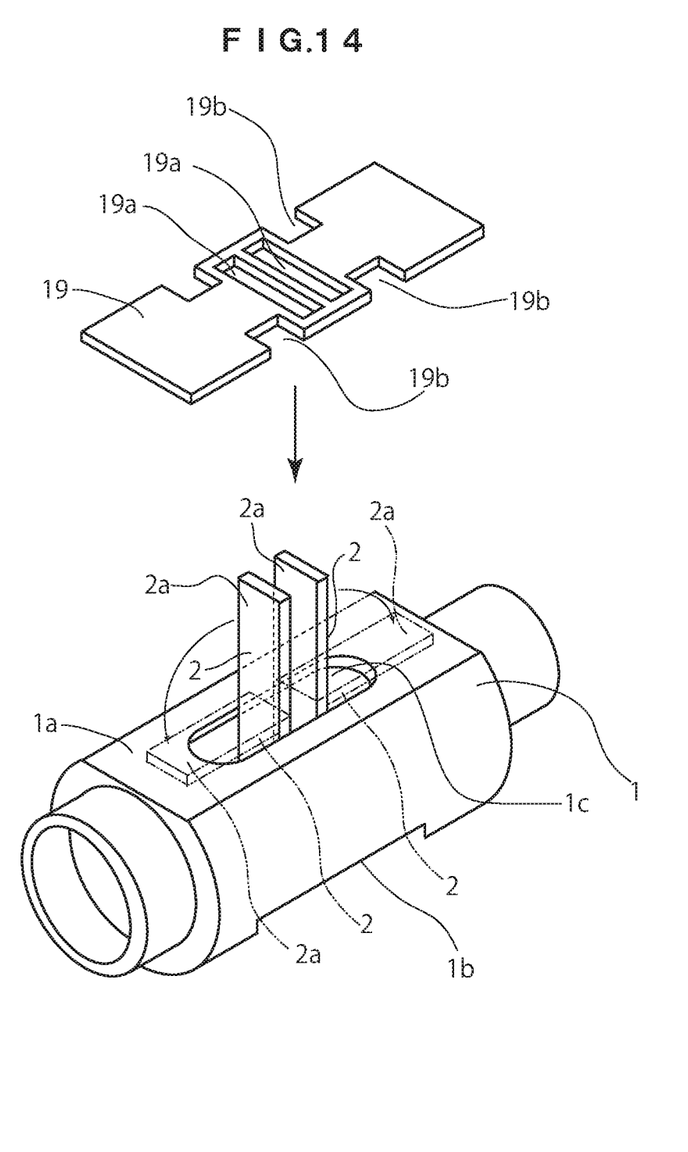
FIG. 14 is a perspective view illustrating a correspondence relation between the isolator holder and a radiation sheet that are used in the heat-dissipating structure for an optical isolator in FIG. 12.

As illustrated in FIG. 12 to FIG. 14, the radiation sheet 19 is formed so as to have a rectangular plate-shaped flat surface made of a material having good thermal conductivity, which is copper in an example of FIG. 14, and covers the flat upper surface 1a of the isolator holder 1. The radiation sheet 19 lies between the flat upper surface 1a of the isolator holder 1 and the outer end portion 2a sides of the bent radiation fins 2. The radiation sheet 19 sandwiches the outer end portion 2a sides of the radiation fins 2 together with a coupled abutting plate portion 13c of a radiation stay 13 from above and below in FIG. 12. By sandwiching the outer end portion 2a sides, heat in the outer end portion sides is dissipated not only to the coupled abutting plate portion 13c but also to the radiation sheet 19. As a result, a heat-dissipating function of the heat-dissipating structure for an optical isolator HD2 improves.

In a center portion of the radiation sheet 19, as illustrated in FIG. 13 and FIG. 14, a pair of long hole-shaped insertion holes 19a, which serves to allow the outer end portion 2a sides of the radiation fins 2 to pass therethrough, is opened. The insertion holes 19a are each used at the time of first assembling the heat-dissipating structure for an optical isolator HD2. Further, in the radiation sheet 19, a plurality of relief holes 19b are provided adjacently to and apart from each of the insertion holes 19a. According to the example illustrated in FIG. 14, two of the relief holes 19b are disposed in right and left places in FIG. 14 with respect to each of the insertion holes 19a. The relief holes 19b each are an opening that serves to enable smooth welding without a molten metal coming into contact with the radiation sheet 19 at the time of forming the welded portion 15 in a process of finally assembling the heat-dissipating structure for an optical isolator HD2.

An accompanying feature of the heat-dissipating structure for an optical isolator HD2 is to include a position holding hollow 13g in place of the position holding hollow 3c1 of the heat-dissipating structure HD1.

Figure 15:
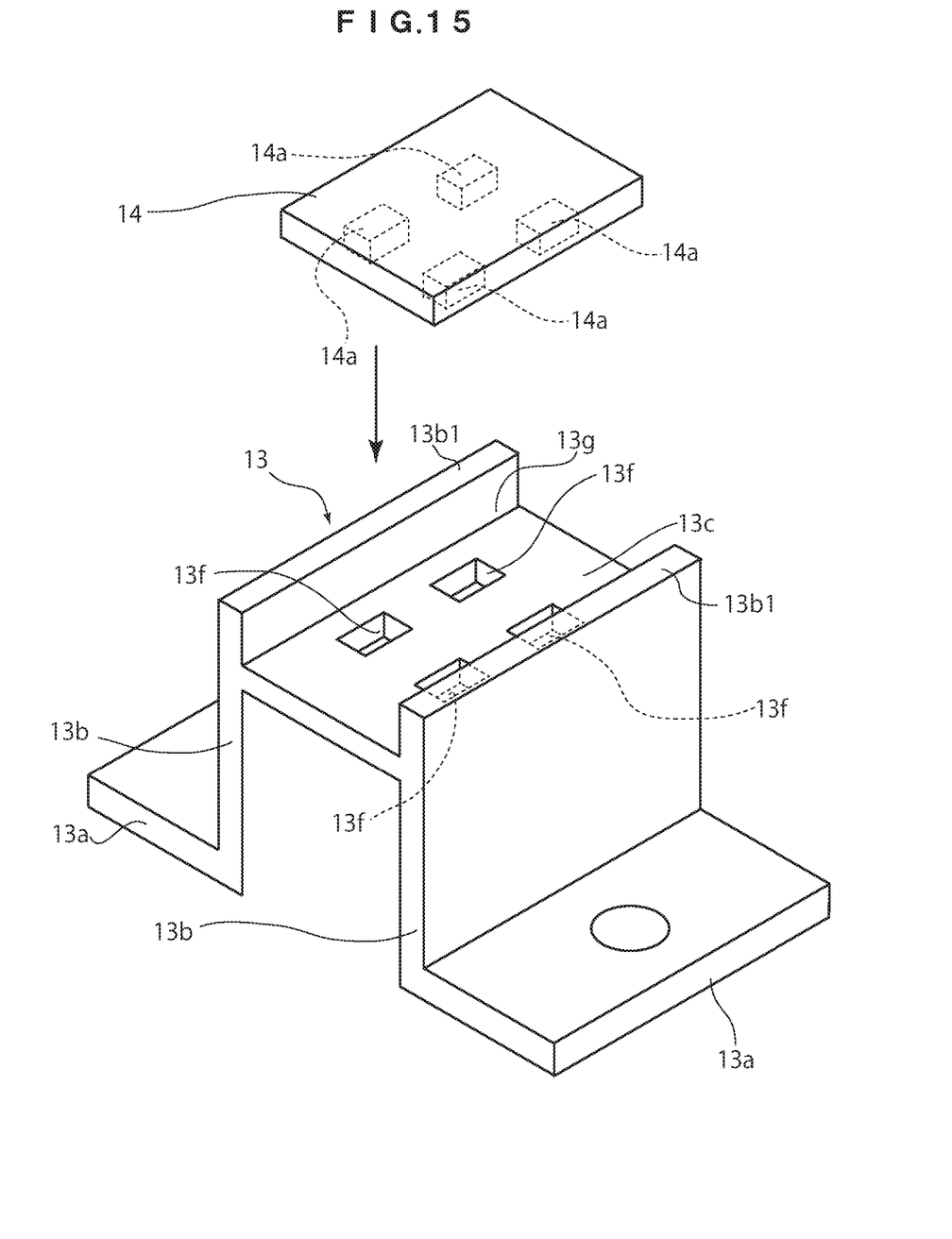
FIG. 15 is a perspective view illustrating a correspondence relation between a radiation stay and a holding stay that are used in the heat-dissipating structure for an optical isolator in FIG. 12.

The position holding hollow 3c1 in the heat-dissipating structure for an optical isolator HD1 is provided in the coupled abutting plate portion 3c of the radiation stay 3. However, as illustrated in FIG. 12, FIG. 13, and FIG. 15, the position holding hollow 13g in the heat-dissipating structure HD2 is formed so as to obtain a space surrounded by upper end portions 13b1 of both side plate portions 13b and the coupled abutting plate portion 13c. Then, in the coupled abutting plate portion 13c of the radiation stay 13, a plurality of openings for welding 13f, which are similar to the aforementioned openings for welding 3f, are opened. The coupled abutting plate portion 13c forms a bottom portion of the position holding hollow 13g. A holding stay 14, which is similar to the aforementioned holding stay 4, can be inserted in the position holding hollow 13g. Thick portions 14a provided projectingly from a lower surface of the holding stay 14 can be fitted into the openings for welding 13f provided in the coupled abutting plate portion 13c. As illustrated in FIG. 12 and FIG. 13, in the process of finally assembling the heat-dissipating structure for an optical isolator HD2, the welded portions 15 each bond the thick portion 14a and the upper portion of the isolator holder 1.

The assembling process of the heat-dissipating structure for an optical isolator HD2 is explained schematically, and first, as illustrated in FIG. 14, a reference stage 18 (FIG. 12) thereby controls the rotation direction of the isolator holder 1 and achieves position stabilization, and at the same time, fixes the reference position.

Then, as illustrated in FIG. 14, the outer end portion 2a sides of the radiation fins 2 are extracted from the inside of the isolator holder 1 to be brought into an upstanding state. While the insertion holes 19a of the radiation sheet 19 facing the outer end portion 2a sides of the upstanding radiation fins 2 individually, the radiation sheet is lowered in an arrow direction in FIG. 14 and is placed on the flat upper surface 1a of the isolator holder to cover the flat upper surface. In a process of lowering the radiation sheet 19, the outer end portion 2a sides of the radiation fins 2 pass through the insertion holes 19a in the radiation sheet 19 individually, thus not preventing a lowering operation. Thereafter, as indicated by chain lines in FIG. 14, the outer end portion 2a sides are each bent toward the flat upper surface 1a of the isolator holder 1 to be overlaid on the upper surface of the radiation sheet. After the outer end portion 2a sides are overlaid, as illustrated in FIG. 12 and FIG. 13, the radiation stay 13 is put on the respective outer end portion 2a sides of the radiation fins 2 and the radiation sheet 19 from above. At the stage where the radiation stay 13 is put on the respective outer end portion 2a sides of the radiation fins 2 and the radiation sheet 19, a lower surface of the coupled abutting plate portion 13c of the radiation stay 13 comes into contact with the upper surfaces of the outer end portion 2a sides of the radiation fins 2, and then the above-described lower surface and the radiation sheet 19 sandwich these outer end portion sides therebetween.

Thereafter, as illustrated in FIG. 15, the holding stay 14 is inserted in the position holding hollow 13g of the radiation stay 13 in an arrow direction in FIG. 15 in a state where the thick portions 14a for welding of the holding stay 14 face the openings for welding 13f of the radiation stay. At this time, the thick portions 14a of the holding stay 14 are fitted into the openings for welding 13f of the radiation stay 13. Then, YAG laser welding is performed from a position, on the upper surface of the holding stay 14, opposite to each of the thick portions 14a toward the lower surface side of the holding stay, which is the rear side, (lower side in FIG. 12). By the welding, the thick portion 14a of the holding stay 14 melts, and a molten metal reaches the flat upper surface 1a of the isolator holder 1 through the opening for welding 13f. Further, one part of the isolator holder 1 also melts and such a columnar welded portion 15 as illustrated in FIG. 12 and FIG. 13 is formed finally. In a process where the welded portion 15 solidifies, the flat upper surface 1a of the isolator holder 1 and the holding stay 14 are bonded gradually to be drawn to each other, and the radiation stay 13 is tightly pressed on and fixed to the isolator holder 1 via the holding stay.

As a result, the outer end portion 2a sides of the radiation fins 2 are tightly held between the coupled abutting plate portion 13c of the radiation stay 13 and the radiation sheet 19 in a pressed state. Heat in the outer end portion 2a sides of the radiation fins 2 is securely dissipated to the radiation stay 13 side and the radiation sheet 19 side.

In FIG. 12 and FIG. 13, seat plate portions 13a each having a mounting hole 13a1 therein correspond to the seat plate portions 3a each having the mounting hole 3a1 therein illustrated in FIG. 1 and FIG. 2.

The number of the radiation fins 2 and the disposed state of the radiation fins 2 are not limited to the one illustrated in FIG. 5. The radiation fins 2 may be such radiation fins as illustrated in each of FIG. 20C, FIG. 21A, and FIG. 21C, for example, which are disclosed in Japanese Patent No. 4077867 described already.

That is, by the configuration of a plurality of components forming the optical isolator main body, the number of radiation fins to be extracted from the isolator holder 1 and the position from which the radiation fin is extracted are not limited to the one illustrated in FIG. 5.

Figure 16:
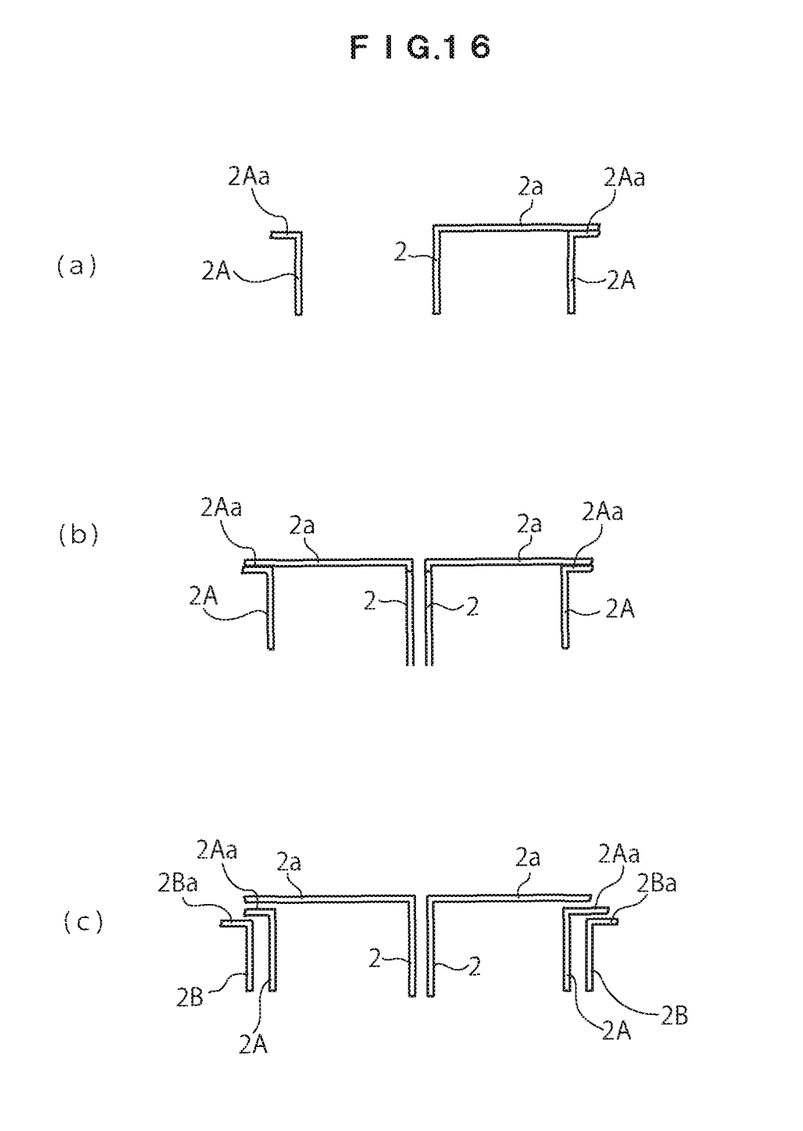
FIGS. 16(a), 16(b), and 16(c) are configuration diagrams illustrating other examples of the number of radiation fins and a disposition state of radiation fins in a summarized manner.

In FIG. 16(*a*), a single radiation fin 2 is disposed in the middle, different radiation fins 2A are disposed across this radiation fin, and an outer end portion 2a of the radiation fin 2 is bent to an outer end portion 2Aa side of the radiation fin 2A on one side to be overlaid on the outer end portion 2Aa.

In FIG. 16(*b*), two radiation fins 2 positioned in the middle are bent back to back each other, different radiation fins 2A are disposed across these radiation fins, and outer end portions 2a of the radiation fins are bent to outer end portion 2Aa sides of the radiation fins 2A individually to be overlaid on the outer end portions 2Aa.

In FIG. 16(*c*), two radiation fins 2 positioned in the middle are bent back to back each other, two pairs of different radiation fins 2A and 2B are disposed across these radiation fins, and outer end portions 2a of the radiation fins are individually bent to sides of outer end portions 2Aa and 2Ba of the radiation fins, the outer end portions 2Aa and 2Ba of each of the radiation fins being in an overlapping state, to be overlaid on the outer end portions 2Aa and 2Ba.

EXPLANATION OF REFERENCES

HD1, HD2 heat-dissipating structure for an optical isolator
1 isolator holder
1a flat upper surface
1c opening for extraction
2, 2A, 2B radiation fin (extracting member for radiation)
2a, 2Aa, 2Ba outer end portion of radiation fin
3, 13 radiation stay
3b, 13b side plate portion
3c, 13c coupled abutting plate portion (abutting plate portion)
3c1, 13g position holding hollow
3c11 slit
3c12 coupling groove
3f, 13f opening for welding
4, 14 holding stay
4a, 14a thick portion
5, 15 welded portion
6A magnetic garnet crystalline film (component)
6B1, 6B2 first heat conductive plate (component)
6C1, 6C2 second heat conductive plate (component)
6D1, 6D2 first doubly refracting crystal plate (component)
6E1, 6E2 second doubly refracting crystal plate (component)
6F magnet (component)
d1 gap for welding
19 radiation sheet
19a insertion hole
19b relief hole

The invention claimed is:

1. A heat-dissipating structure for an optical isolator, comprising:

a cylindrical isolator holder that has a plurality of components configuring an optical isolator main body disposed thereinside and has an opening for extraction reaching the inside formed in an outer portion thereof;

extracting members for radiation that are extracted from the inside of said isolator holder through the opening for extraction in the outer portion;

a radiation stay that is made of a member having good thermal conductivity, is disposed on an outer side of said isolator holder to surround said isolator holder, and includes an abutting plate portion in contact with said extracting members for radiation;

a holding stay in contact with the abutting plate portion of said radiation stay; and welded portions bonding said holding stay and said isolator holder through openings for welding, wherein the abutting plate portion is positioned between said isolator holder and said holding stay, the openings for welding are opened in the abutting plate portion in a passing-through state from a side of said holding stay toward a side of said isolator holder, the welded portions apply tensile force that draws said holding stay and said isolator holder, and the abutting plate portion presses said extracting members for radiation via the tensile force.

2. The heat-dissipating structure for an optical isolator according to claim 1, further comprising:
  a radiation sheet that is made of a member having good thermal conductivity, said radiation sheet being disposed between the abutting plate portion and the outer portion of said isolator holder and sandwiching said extracting members for radiation together with the abutting plate portion.

3. The heat-dissipating structure for an optical isolator according to claim 1, wherein
  said radiation stay includes side plate portions that cover both sides of said isolator holder; and a coupled abutting plate portion being the abutting plate portion that covers an outer portion side of said isolator holder and is coupled between the both side plate portions, said holding stay has thick portions for welding formed thereon, the thick portions of said holding stay are fitted into the openings for welding, and said welded portions bond said holding stay and said isolator holder through the thick portions.

4. The heat-dissipating structure for an optical isolator according to claim 3, wherein
  a bottomed position holding hollow is provided in the coupled abutting plate portion, said holding stay is fitted in the position holding hollow, and the openings for welding are opened in a bottom portion of the position holding hollow.

5. The heat-dissipating structure for an optical isolator according to claim 3, wherein
  a gap that enables welding is made between the thick portions of said holding stay and the outer portion of said isolator holder.

* * * * *